(12) United States Patent
Fabiilli

(10) Patent No.: US 8,723,039 B2
(45) Date of Patent: May 13, 2014

(54) WIRE HARNESS WITH SLACK ABSORPTION

(75) Inventor: Marta A. Fabiilli, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 126 days.

(21) Appl. No.: 13/431,015

(22) Filed: Mar. 27, 2012

(65) Prior Publication Data

US 2013/0256027 A1    Oct. 3, 2013

(51) Int. Cl.
*H02G 3/04*    (2006.01)

(52) U.S. Cl.
USPC ......... 174/72 A; 174/135; 174/68.1; 174/68.3

(58) Field of Classification Search
USPC .............. 174/68.1, 68.3, 135, 72 A; 248/49
See application file for complete search history.

(56) References Cited

U.S. PATENT DOCUMENTS

| | | | |
|---|---|---|---|
| 5,164,546 A * | 11/1992 | Kumagai | 174/135 |
| 6,417,451 B1 * | 7/2002 | Uchiyama | 174/72 A |
| 6,494,523 B2 * | 12/2002 | Kobayashi | 296/155 |
| 6,566,603 B2 * | 5/2003 | Doshita et al. | 174/72 A |
| 6,570,093 B2 * | 5/2003 | Doshita et al. | 174/72 A |
| 6,723,923 B2 * | 4/2004 | Tsukamoto | 174/68.1 |
| 6,747,208 B2 * | 6/2004 | Miyamoto et al. | 174/68.1 |
| 6,834,900 B2 * | 12/2004 | Wright | 296/1.01 |
| 7,075,011 B1 | 7/2006 | Kogure et al. | |
| 7,341,478 B2 * | 3/2008 | Tsubaki et al. | 439/501 |
| 8,011,720 B2 | 9/2011 | Wippler | |
| 8,487,182 B2 * | 7/2013 | Yamashita | 174/72 A |
| 2009/0200062 A1 * | 8/2009 | Aoki | 174/136 |
| 2010/0294563 A1 * | 11/2010 | Yamashita | 174/72 A |
| 2012/0292081 A1 * | 11/2012 | Kim et al. | 174/135 |
| 2013/0153716 A1 * | 6/2013 | Lothamer | 248/68.1 |

FOREIGN PATENT DOCUMENTS

JP    1111231    1/1999

* cited by examiner

*Primary Examiner* — Hoa C Nguyen
*Assistant Examiner* — Amol Patel
(74) *Attorney, Agent, or Firm* — Brinks Gilson & Lione

(57) ABSTRACT

A wire harness unit including a wire bundle. The wire bundle is axially fixed to a clamp tab at a location between first and second ends. Formed in the wire bundle between the clamp tab and a connector is a bight portion. A first part of the wire bundle, on one side of the bight, is fixedly secured to a second part of the wire bundle, on the other side of the bight, by a fastener extending from the first part to the second part. The first part of the wire bundle is supported by the second part of the wire bundle such that the first part of the wire bundle is held substantially parallel to the second part of the wire bundle and such that an intermediate portion is substantially prevented from sagging.

18 Claims, 2 Drawing Sheets

WIRE HARNESS WITH SLACK ABSORPTION

BACKGROUND

1. Field of the Invention

The present invention generally relates to wire harness units utilized in automotive vehicles. More specifically, the invention relates to slack absorption in a wire harness unit during the installation of an electrical component in the automotive vehicle.

2. Description of Related Art

Wire harness units are used in many applications in an automotive vehicle. For example, in order to connect a head unit (the unit comprising the vehicles audio/entertainment/navigation systems) to the electrical system of the vehicle, a connector on the end of the wire harness unit is drawn out from behind the instrument panel, through the opening in which the head unit is to be installed, and connected to the head unit. In order to be able to draw out the connector a distance sufficient to allow it to be connected to the head unit, a certain amount of slack must be provided in the wire harness unit. While allowing the extending of the wire harness unit for installation purposes, this slack can pose a subsequent problem when the head unit is moved into its installed position.

To install the head unit, head unit is moved forward (toward the forward end of the vehicle) into the opening through which the connector was previously drawn out. The slack of the wire harness unit is therefore reintroduced into the area behind the instrument panel. The area behind the instrument panel, however, is increasingly occupied by additional and other componentry. As a result, space within this area is at a premium, and any slack in the wire harness unit may result in the wire bundle of the wire harness unit becoming entangled with other componentry or may result in the wire bundle impinging on other componentry and either becoming pinched or impairing the installation of the head unit. For this reason, controlling or absorbing the slack in the wire harness unit must be taken into account.

One means by which the slack in a wire harness unit is absorbed is by providing a slack absorbing apparatus or guide. The slack absorbing apparatus is typically a plastic part with a receptacle that accommodates a coiled or curved portion of the wire bundle of the wire harness unit such that as the wire bundle is drawn or pulled out for connection to the head unit, the coiled portion is similarly drawn out of the plastic part. When the wire bundle is inserted or pushed in during installation of the head unit, the wire bundle is forced into the receptacle of the plastic part where it is supported and the slack is prevented from sagging and/or impinging upon other componentry in the area behind the instrument panel. The use of a slack absorbing apparatus introduces additional complexity, size, weight and cost to the wire harness unit.

SUMMARY

In satisfying the above, as well as overcoming the enumerated drawbacks and other limitations of the related art, the present invention provides a wire harness unit that absorbs slack in the wire bundle of the unit without utilizing a separate and distinct slack absorbing apparatus.

According to one aspect of the invention, a wire harness unit for an automotive vehicle, the wire harness unit comprises a wire bundle having a first end and a second end, a connector attached to the first end of the wire bundle and configured to be coupled to a component of the automotive vehicle, the second end of the wire bundle being configured to be attached to a further component of the automotive vehicle; a clamp tab, the wire bundle being connected to the clamp tab at a location between the first and second end such that the wire bundle is axially fixed to the clamp tab, a fastener adapted to fixedly connect the clamp tab to a body structure of the automotive vehicle; and a bight formed in the wire bundle between the clamp tab and the connector, and a first part of the wire bundle being located between the bight and the connector, a second part of the wire bundle being located on an opposing side of the bight from the first part of the wire bundle, the first part of the wire bundle being fixedly secured to the second part of the wire bundle by a fastener extending from the first part to the second part, the first part of the wire bundle being supported by the second part of the wire bundle such that the first part of the wire bundle is substantially parallel to the second part of the wire bundle; and whereby an intermediate portion of the wire bundle between the first part and the connector is substantially prevented from sagging between the first part and the connector.

In another aspect of the invention, the first part of the wire bundle is located immediately adjacent to the bight.

In further aspect of the invention, the first part of the wire bundle is located immediately adjacent to the bight on one side of the bight and the second part of the wire bundle is located immediately adjacent to the bight on the opposite side of the bight.

In still another aspect of the invention, the body structure of the vehicle is an instrument panel pad.

In yet another aspect of the invention, the second part of the wire bundle is connected to the clamp tab.

In an additional aspect of the invention, the wire bundle is connected to the clamp tab by adhesive tape.

In further aspect of the invention, the fastener is adhesive tape extended about the first and second parts of the wire bundle.

In another aspect of the invention, the fastener is adhesive tape extended about the first part of the wire bundle, the second part of the wire bundle and the clamp tab.

In still a further aspect of the invention, the wire bundle is semi-rigid.

In yet another aspect of the invention, the first and second parts of the wire bundle generally project into free space from the body structure.

In an additional aspect of the invention, the intermediate portion of the wire bundle is substantially in plane with the first part of the wire bundle.

In another aspect of the invention, a wire harness unit comprises a wire bundle having a first end and a second end; a clamp tab, the wire bundle being connected to the clamp tab at a location between the first and second end such that the wire bundle is axially fixed to the clamp tab, the clamp tab including an integral fastener adapted to fixedly connect the clamp tab to a body structure; and a bight formed in the wire bundle adjacent to the clamp tab, a first part of the wire bundle being adjacent to the bight and a second part of the wire bundle being adjacent to the clamp tab, the first and second parts of the wire bundle being located on opposing sides of the bight, the first part of the wire bundle being fixedly secured to the second part of the wire bundle by a fastener extending from the first part about the second part of the wire bundle, the first part of the wire bundle being supported by the second part of the wire bundle such that the first part of the wire bundle is substantially parallel to the second part of the wire bundle; and whereby an intermediate portion of the wire bundle adjacent to the first part is retained substantially in plane with the first part.

In yet another aspect of the invention, the first part of the wire bundle is immediately adjacent to the bight.

In a further aspect of the invention, the second part of the wire bundle is connected to the clamp tab.

In still another aspect of the invention, the wire bundle is connected to the clamp tab by adhesive tape.

In an additional aspect of the invention, the fastener is adhesive tape extended about the first and second parts of the wire bundle.

In a still further aspect of the invention, the fastener is adhesive tape extended about the first part of the wire bundle, the second part of the wire bundle and the clamp tab.

In still another aspect of the invention, the wire bundle is semi-rigid.

In another aspect of the invention, the first and second parts of the wire bundle generally project into free space from the body structure.

Further objects, features and advantages of this invention will become readily apparent to persons skilled in the art after a review of the following description, with reference to the drawings and claims that are appended to and form a part of this specification.

DETAILED DESCRIPTION

Figure 1:
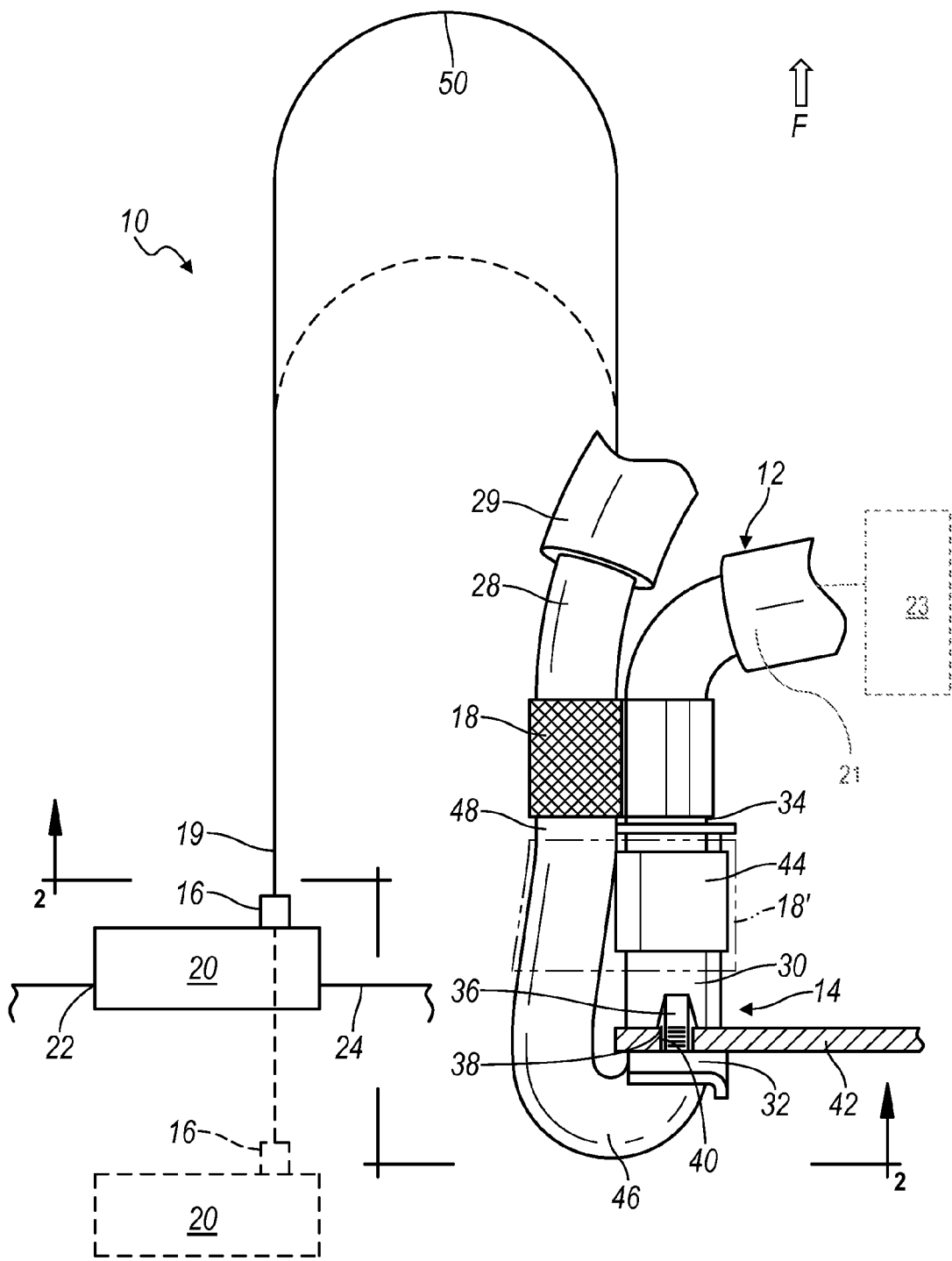
FIG. 1 is top plan and partially schematic illustration of an embodiment, and an alternative embodiment, of a wire harness unit incorporating the principles of the present invention.

Referring now to the drawings, a wire harness unit embodying the principles of the present invention is illustrated therein and generally designated at 10. As its primary components, the wire harness unit 10 includes a wire bundle 12, a clamp tab 14, a connector 16 and a fastener 18, the latter of which secures two portions of the wire bundle 12 together.

The connector 16 is an interconnecting device for establishing an electrical connection between the wire bundle 12 and an electrical component of the vehicle. The connector 16 is therefore provided on first end 19 of the wire bundle 12. The electrical component may be any one of the various electrical components in a vehicle, but in the discussion that follows and the figures used to illustrate the present invention, the electrical component is identified and referred to as a head unit 20. As the term is used herein, the head unit 20 is an electrical component of the vehicle's audio/entertainment/navigation system. A second end 21 of the wire bundle is therefore connected to further component 23 of the vehicle. The head unit 20 is mounted in an opening 22 defined in the instrument panel 24 of the vehicle.

In order to install the head unit 20 in the opening 22 of the instrument panel 24, the connector 16 and the wire bundle 12 of the wire harness unit 10 must be drawn out of and through the opening 22 in the instrument panel 24. Once pulled through the opening 22, the connector 16 is attached to the rear of the head unit 20, and the head unit 20 is then inserted into the opening 22 and secured to the instrument panel 24. During the insertion of the head unit 20 into the opening 22, the wire bundle 12 is pushed into the space behind the instrument panel 24. With the present invention, the position of the wire bundle 12 is managed and controlled so that the wire bundle 12 does not impinge upon other devices and componentry located within the space. In this manner, the wire bundle 12 of the wire harness unit 10 does not impede installation of the head unit 20 and avoids possible impingement or pinching of the wire bundle 12 itself.

The wire bundle 12, while illustrated as including a plurality of individual wires or conductors 26, may be provided as a single wire 26 instead of the illustrated collection of wires 26, depending on the particular application in which the wire harness unit 10 is being employed. In addition to the individual wires 26, the wire bundle 12 may include one or more insulative sheaths or covers 28, 29, which are provided to retain the collection of wires 26 together, electrically isolate the wires 26 and/or protect the wires 26 from abrasion and other factors. As a result of the collection of wires 26 and the covers 28, 29, the wire bundle 12 may be characterized as being semi-rigid.

In order to position the wire bundle 12 in the space behind the instrument panel 24, the clamp tab 14 is utilized. The clamp tab 14 can be provided in a variety of configurations and is illustrated as having an axial flange 30 and a radial flange 32. The axial flange 30 is oriented so as to extend axially along a first or distal part 34 of the wire bundle 12. The radial flange 32 is oriented generally perpendicularly to the axial flange 30 and generally radially or transversely with respect to the wire bundle 12. Formed on the radial flange 32 is a tab projection 36 that includes one or more shoulders 38 spaced apart from and opposing the radial flange 32. The tab projection 36 is received through a bore 40 defined in an instrument panel pad 42, which is structurally connected to the vehicle. When inserted through the bore 40, the shoulders 38 are compressed and pass through the bore 40, thereby positively retaining the clamp tab 14 with the instrument panel pad 42.

The distal part 34 of the wire bundle 12 is secured to the axial flange 30 of the clamp tab 14. This securement may be achieved in a variety of ways, and one preferred method is the use adhesive tape 44 to fasten the distal part 34 of the wire bundle 12 to the axial flange 30. In such an instance, the adhesive tape 44 is wrapped around the axial flange 30 and the distal part 34 of the wire bundle 12 so as to substantially prevent relative movement therebetween.

Between the clamp tab 14 and the connector 16, immediately adjacent to the clamp tab 14, the wire bundle 12 is reversely bent to form a bight 46. Between the bight 46 and the connector 16, immediately adjacent to the bight 46, a second or proximal part 48 of the wire bundle 12 is positioned substantially parallel and immediately adjacent to the distal part 34 of the wire bundle 12. The proximal part 48 of the wire bundle 12 is secured to the distal part 34 by the fastener 18, which may be any one of a variety of fasteners that can be used to join two generally cylindrical objects together. As such, the fastener 18 may be a specifically designed connector, adhesive tape or a strip of hook and loop fastening material, the latter of which is depicted in FIG. 1. As also seen in FIG. 1, the fastener 18 is positioned so as to extend around the distal and proximal parts 34, 48 of the wire bundle 12 in an area just beyond the clamp tab 14. In an alternative embodiment, this fastener may be located so as to extend around and about, not only the distal and proximal parts 34, 48, but also the clamp tab 14. The positioning of the fastener according to this alternative embodiment is illustrated in phantom in FIG. 1 and is generally designated at 18'.

By securing the wire bundle 12 a manner that positions the proximal part 48 substantially parallel to the distal part 34, the semi-rigid nature of the wire bundle 12 is advantageously utilized to control the slack in an intermediate portion (loop 50) of the wire bundle 12 between the proximal part 48 and the connector 16.

Figure 2:
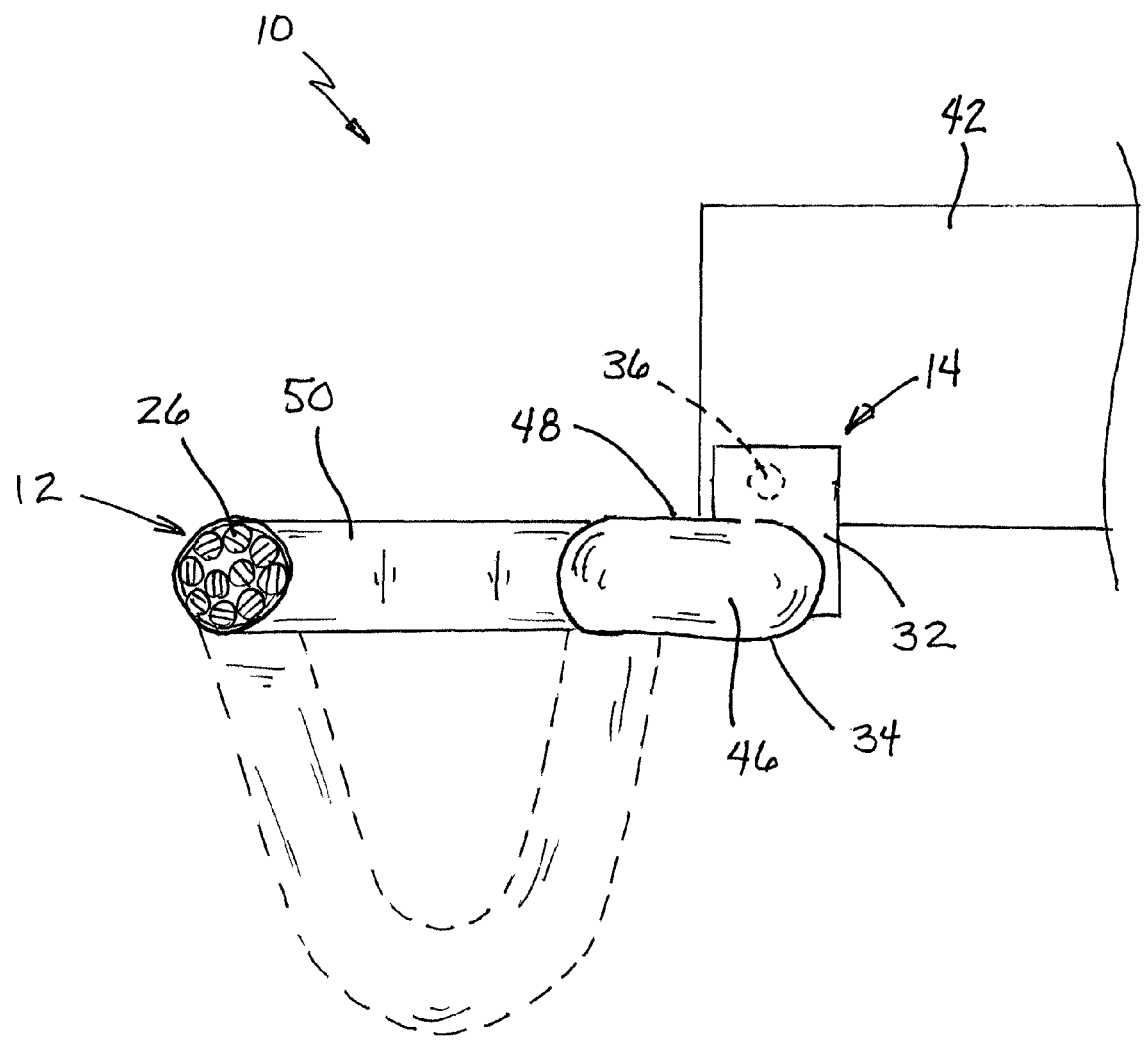
FIG. 2 is an end elevational view, generally taken along line 2-2 of FIG. 1, of the wire harness unit depicted in FIG. 1.

From the proximal part 48 to the connector 16, the wire bundle 12 forms a loop 50 that is extended into free space in the area behind the instrument panel 24. When the connector 16 and wire bundle 12 are drawn out of the opening 22 during installation of the head unit 20, the loop 50 advances to the position generally designated by the dashed line in FIG. 1. After the head unit 20 has been installed, the wire bundle 12 is pushed back into the area behind the instrument panel 24 and the loop 50 moves to the position generally seen by the solid line designation FIG. 1. As seen in FIG. 2, the loop 50 is positioned in free space so as to be generally in plane with the distal part 34 and the proximal part 48. The loop 50 is thus prevented from sagging out of plane, which designated by the dashed lines in FIG. 2. With the loop 50 being retained substantially in plane with the distal and proximal parts 34, 48, the area behind the instrument panel 24, and the componentry located therein, can be designed and positioned knowing that the slack which forms the loop 50 of the wire bundle 12 will not become entangled or impinged upon that componentry. This provides an increased amount of design freedom in developing the area behind the instrument panel 24.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A wire harness unit for an automotive vehicle, the wire harness unit comprising:
    a wire bundle having a first end and a second end, a connector attached to the first end of the wire bundle and configured to be coupled to a component of the automotive vehicle, the second end of the wire bundle being configured to be attached to a further component of the automotive vehicle;
    a clamp tab, the wire bundle being connected to the clamp tab at a location between the first and second end such that the wire bundle is axially fixed to the clamp tab, a fastener adapted to fixedly connect the clamp tab to a body structure of the automotive vehicle; and
    a bight formed in the wire bundle between the clamp tab and the connector, and a first part of the wire bundle being located between the bight and the connector, a second part of the wire bundle being located on an opposing side of the bight from the first part of the wire bundle, the first part of the wire bundle being fixedly secured to the second part of the wire bundle by a second fastener extending from the first part to the second part, the first part of the wire bundle being supported by the second part of the wire bundle such that the first part of the wire bundle is substantially parallel to the second part of the wire bundle; and
    whereby an intermediate portion of the wire bundle between the first part and the connector extends into free space and is generally co-planar with the first part and the second part and substantially prevented from sagging between the first part and the connector.

2. The wire harness unit according to claim 1, wherein the first part of the wire bundle is immediately adjacent to the bight.

3. The wire harness unit according to claim 1, wherein the first part of the wire bundle is located immediately adjacent to the bight on one side of the bight and the second part of the wire bundle is located immediately adjacent to the bight on the opposite side of the bight.

4. The wire harness unit according to claim 1, wherein the body structure of the vehicle is an instrument panel pad.

5. The wire harness unit according to claim 1, wherein the second part of the wire bundle is connected to the clamp tab.

6. The wire harness unit according to claim 1, wherein the wire bundle is connected to the clamp tab by adhesive tape.

7. The wire harness unit according to claim 1, wherein the second fastener is adhesive tape extended about the first and second parts of the wire bundle.

8. The wire harness unit according to claim 1, wherein the second fastener is adhesive tape extended about the first part of the wire bundle, the second part of the wire bundle and the clamp tab.

9. The wire harness unit according to claim 1, wherein the wire bundle is semi-rigid.

10. The wire harness unit according to claim 1, wherein the first and second parts of the wire bundle generally project into free space from the body structure.

11. A wire harness unit comprising:
    a wire bundle having a first end and a second end;
    a clamp tab, the wire bundle being connected to the clamp tab at a location between the first and second end such that the wire bundle is axially fixed to the clamp tab, the clamp tab including an integral fastener adapted to fixedly connect the clamp tab to a body structure; and
    a bight portion formed in the wire bundle adjacent to the clamp tab, a first part of the wire bundle being adjacent to the bight and a second part of the wire bundle being adjacent to the clamp tab, the first and second parts of the wire bundle being located on opposing sides of the bight, the first part of the wire bundle being fixedly secured to the second part of the wire bundle by a second fastener extending from the first part about the second part of the wire bundle, the second fastener located such that the clamp tab, the first part of the wire bundle, the bight and the second part of the wire bundle are all one side of the second fastener, the first part of the wire bundle being supported by the second part of the wire bundle such that the first part of the wire bundle is substantially parallel to the second part of the wire bundle; and
    whereby an intermediate portion of the wire bundle adjacent to the first part is retained substantially in plane with the first part.

12. The wire harness unit according to claim 11, wherein the first part of the wire bundle is immediately adjacent to the bight.

13. The wire harness unit according to claim 11, wherein the second part of the wire bundle is connected to the clamp tab.

14. The wire harness unit according to claim 11, wherein the wire bundle is connected to the clamp tab by adhesive tape.

15. The wire harness unit according to claim 11, wherein the second fastener is adhesive tape extended about the first and second parts of the wire bundle.

16. The wire harness unit according to claim 11, wherein the second fastener is adhesive tape extended about the wire bundle immediately adjacent to the first part of the wire bundle, the second part of the wire bundle and the clamp tab.

17. The wire harness unit according to claim 11, wherein the wire bundle is semi-rigid.

18. The wire harness unit according to claim 11, wherein the first and second parts of the wire bundle generally project into free space from the body structure.

* * * * *

UNITED STATES PATENT AND TRADEMARK OFFICE
CERTIFICATE OF CORRECTION

| | | |
|---|---|---|
| PATENT NO. | : 8,723,039 B2 | Page 1 of 1 |
| APPLICATION NO. | : 13/431015 | |
| DATED | : May 13, 2014 | |
| INVENTOR(S) | : Fabilli | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 127 days.

Signed and Sealed this
Second Day of February, 2016

Michelle K. Lee
*Director of the United States Patent and Trademark Office*